United States Patent
Nagao

[15] 3,670,387
[45] June 20, 1972

[54] NUT AND WASHER FEEDING DEVICE

[72] Inventor: Tetsuya Nagao, 23, 2-chome, Kitadori, Minamiterakata, Moriguchi, Japan

[22] Filed: Dec. 16, 1970

[21] Appl. No.: 98,609

[52] U.S. Cl. ..........................................................29/211 R
[51] Int. Cl. ................................................................B23q 7/10
[58] Field of Search ..............29/211 R, 211 D, 208 R, 208 D, 29/200 P

[56] References Cited

UNITED STATES PATENTS 3,095,344  6/1963  Sandow..............................29/211 R X
3,345,729  10/1967  Law......................................29/211 R Primary Examiner—Thomas H. Eager
Attorney—Moonray Kojima

[57] ABSTRACT

An automatic feeder of nuts and washers, having a long slim spindle slidably inserted in a sleeve in a relation to have the sleeve reciprocate together with the spindle as the latter reciprocates in connection with driving means, so that nuts or washers are shot by the sleeve and guided along the spindle down to a given processing position one after another continuously.

1 Claim, 5 Drawing Figures

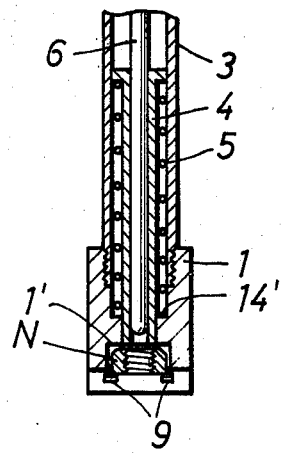
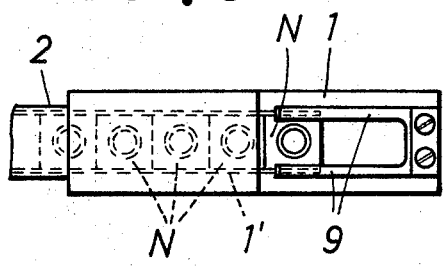
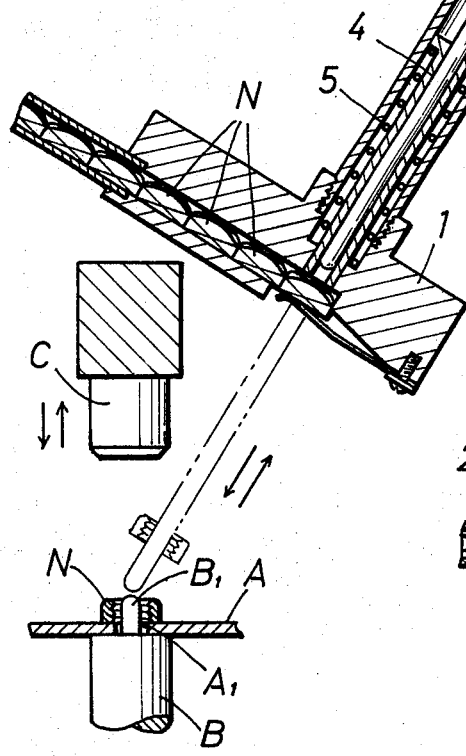
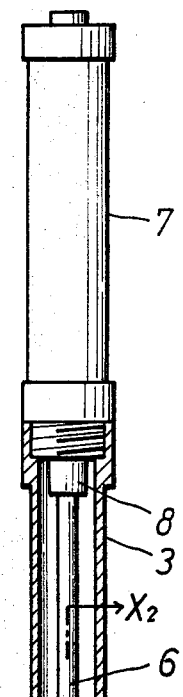
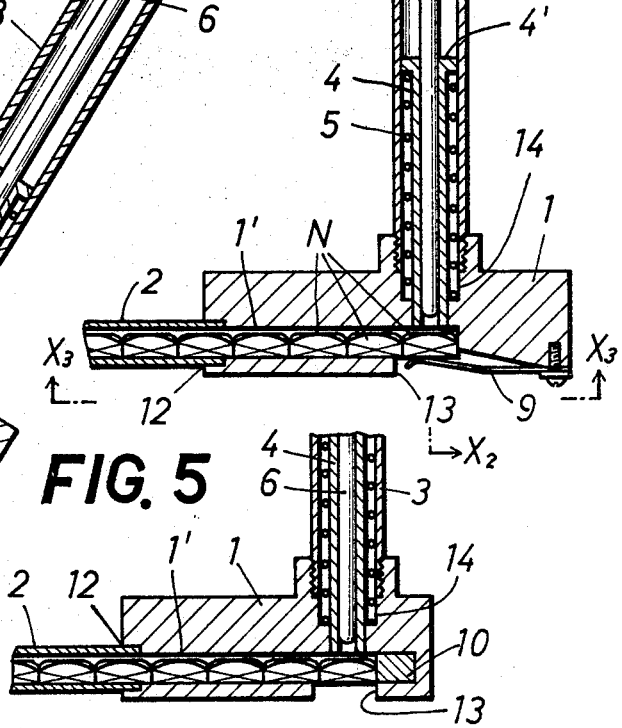

NUT AND WASHER FEEDING DEVICE

The present invention relates to a feeding device, and more particularly to an automatic unit to feed nuts or washers continuously to a given processing position.

Nuts are often spot-welded on a metallic plate article such as the body of a motor vehicle or the cover of an electric appliance. In such a case, a plate article having a plurality of bolt holes punched through it is initially put to a spot welding machine with a pair of electrodes in a manner that one of the bolt holes is placed on the top of the lower electrode in an aligned relation to a positioning pin provided for this purpose at the top of same electrode, then a nut is put exactly on the bolt hole also in an aligned relation to the positioning pin, and the upper electrode is lowered to spot-weld the nut to the plate article at that position. After one bolt hole is welded with a nut and the upper electrode is raised, the plate article is shifted so as to have another bolt hole placed on the top of the lower electrode and welded with a nut at the same welding position similarly.

Conventionally in the above-described welding process nuts are put on the bolt holes of plate article by hand one after another in an aligned relation to the positioning pin, therefore taking much time and labor; this is especially so in case of handling substantially small-sized nuts. In addition, the human hand is liable to get burnt or compressed when it works around the heated electrodes of spot welding machine. A device, if placed much near to the spot welding machine, will be more or less influenced undesirably by the heat of electrodes.

A major object of the invention is to provide an automatic unit which feeds nut or washers to a given processing position continuously.

Another object of the invention is to provide a feeding unit which saves much time and labor in feeding nuts or washers to a given processing position.

A further object of the invention is to provide a feeding unit to be operated quite safely to feed nuts or washers to a given processing position.

A further object of the invention is to provide a feeding unit to be installed sufficiently far from a given processing position but able to feed nuts or washers to the same processing position correctly.

Other objects and advantages of the invention will be more fully understood from the following description of preferred forms of the invention shown by way of examples in the accompanying drawings in which:

FIG. 1 is a vertical section in part of a feeding unit embodying the invention;

FIG. 2 is a vertical elevation taken approximately on the line X2—X2 in FIG. 1;

FIG. 3 is an end view taken approximately from the line X3—X3 in FIG. 1;

FIG. 4 is a part-cut vertical section of the feeding unit in FIG. 1 working in combination with a spot welding machine, with the spindle shown in dark line when it is withdrawn to the maximum extent and in dotted line when it is forwarded to the maximum extent and guiding a nut along it; and FIG. 5 is a part-cut vertical section of another embodiment of the invention.

The embodiment shown in FIGS. 1 to 4 is a feeding unit preferably to work in combination with a spot welding machine to weld nuts to a metallic plate article.

The spot welding machine is provided with an upper electrode C and a lower electrode B as shown in FIG. 4. The lower electrode B is stationary and is provided with a positioning pin B1 at the top end. The upper electrode C is vertically movable. A metallic plate article which is designated at A in FIG. 4 has a plurality of bolt holes A1 punched through it.

The feeding unit primarily comprises a block 1, an upright nozzle 3 mounted on the block 1, and a pneumatic cylinder 7 mounted on the nozzle 3, as best shown in FIG. 1.

The bock 1 is provided with a longitudinal conduit 1' and an upright aperture 14. The longitudinal conduit 1' has an inlet 12 at one side of the block 1 and an outlet 13 at the bottom of block 1. The inlet 12 is connected to a chute 2 through which nuts N are supplied from outside. The outlet 13 is provided with a leaf spring 9 in a cantilever relation to the bottom of block 1. The lower end of upright aperture 14 opens to the outlet 13 in a perpendicularly crossing relation to the conduit 1', while the upper end of same opens at the top of block 1. The aperture 14 is provided with a shoulder 14' around the middle part.

The upright nozzle 3 is a hollow cylinder. The lower end of nozzle 3 is inserted into the aperture 14 of block 1 in a fixed relation, while the upper end of same is coupled with the lower end of pneumatic cylinder 7 in a fixed relation. A sleeve 4 is provided in the nozzle 3 in a slidable relation both to the nozzle 3 and to the aperture 14 of block 1. The sleeve 4 has an annular flange 4' at the upper end. A coil spring 5 is provided around the sleeve 4 between the flange 4' and the shoulder 14' of block 1.

The pneumatic cylinder 7 is provided with a piston rod 8 to reciprocate in and out of the cylinder 7. A long slim spindle 6 is fixed at the lower end of piston rod 8. The spindle 6 is inserted into the sleeve 4 in a slidable relation. A pneumatic source (not shown) is connected to the cylinder 7 in a driving relation.

The feeding unit as a whole is installed in such an inclined relation to the axial direction of electrodes B and C so that feeding of nuts may be facilitated between the electrodes sufficiently, as shown in FIG. 4.

The diameter of spindle 6 is less than the hole diameter of nut N so that the latter may be guided along the former in a freely slidable relation. The length of spindle 6 is such that the lower end of spindle 6 may just meet the upper end of positioning pin B1 as shown in dotted line in FIG. 4 when the piston rod 8 is forwarded out of the cylinder 7 to the maximum extent, and that the lower end of spindle 6 may fully recede from the conduit 1' as shown in dark line in FIG. 4 when the piston rod 8 is withdrawn into the cylinder 7 to the maximum extent.

The inner diameter of sleeve 4 is less than the width of nut N but more than the hole diameter of nut N so that the latter may be shot through the outlet 13 of conduit 1' by the former when the former is forwarded out of the aperture 14 of block 1. The inner diameter of sleeve flange 4' is less than the diameter of piston rod 8 so that the sleeve 4 may be pushed forward by the piston rod 8 when the latter is forwarded sufficiently out of the cylinder 7.

The elasticity of coil spring 5 is such that the lower end of sleeve 4 may fully recede from the conduit 1' when the sleeve 4 is not pushed forward by the piston rod 8, and that the lower end of sleeve 4 may overpass the leaf spring 9 when the sleeve is pushed forward by the piston rod 8.

The leaf spring 9 is U-shaped in plan and arranged such that it may normally hold one nut in a shooting position at the open end as best shown in FIGS. 2 and 3. The clearance between both sides of U-shape leaf spring 9 is larger than the outer diameter of sleeve 4 so that the sleeve 4 may pass through the leaf spring 9 freely. The elasticity of leaf spring 9 is such that a nut may be held in the shooting position on the leaf spring 9 when the nut is not shot by the sleeve 4, and that the nut may yield and pass the leaf spring 9 outwardly when the nut is shot by the sleeve 4.

The working relation of spindle 6 and sleeve 4 is such that the former may just meet the pin B1 the moment when the latter shoots a nut.

In the operation, the upper electrode C is initially in the raised position, and the plate article A is put to the lower electrode B in a manner that one of the bolt holes A1 is placed on the top of the electrode B in an aligned relation to the positioning pin B1. Meanwhile a plurality of nuts N are continuously supplied from outside into the conduit 1' by way of the chute 2 in a manner that the first nut is held in the shooting position on the leaf spring 9 just under the aperture 14. Then the pneumatic cylinder 7 is actuated to have the piston rod 8 reciprocate.

As the piston rod 8 is forwarded out of the cylinder 7, the spindle 6 is forwarded out of the aperture 14 toward the positioning pin B1 in an inserted relation to the first nut.

When it is forwarded further, the piston rod 8 pushes the sleeve 4 forward out of the aperture 14 against the elasticity of coil spring 5 to an extent that the lower end of sleeve 4 overpasses the leaf spring 9, and thereby shooting the first nut through the outlet 13 against the elasticity of leaf spring 9.

When shot, the first nut is guided along the spindle 6 down to the pin B1 and then put exactly on the bolt hole A1 of plate article A on the lower electrode B.

Then the piston rod 8 is withdrawn into the cylinder 7. Accordingly the spindle 6 is withdrawn into the aperture 14 in connection with the piston rod 8. As the same time, the sleeve 4 is withdrawn into the aperture 14 by the elasticity of coil spring 5. The leaf spring 9 is returned to the original state by its own elasticity the moment the nut N yields and passes it. And now the second nut is permitted into the shooting position just under the aperture 14 and held there on the leaf spring 9 till it is shot by the sleeve 4 on the next occasion similarly.

After the spindle 6 is withdrawn into the aperture 14, the upper electrode C is lowered to spot-weld the first nut to the plate article A. This completes welding of a nut N on one of the bolt holes A1 of plate article A.

Then the upper electrode C is raised again, and the plate article A is shifted so as to have another bolt hole A1 placed on the top of the lower electrode B and welded with the second nut similarly.

As long as nuts N are supplied continuously to the conduit 1' by way of the chute 2, the feeding unit will automatically feed the nuts to the positioning pin B1 of stationary electrode B one after another continuously.

Since nuts are fed to the positioning pin B1 one after another automatically, there will be no need of handling the nuts manually, and this will save much time and labor in the nut feeding process. Since there is no need of handling the nuts manually, there will be no possibility of getting the human hand burnt or compressed in contact with the heated electrodes, and this will assure safe operation in the nut feeding process. As the spindle 6 reciprocates in an inserted and thus assuredly supported relation to the sleeve 4, the diameter of spindle 6 can be decreased considerably without a fear of impairing its function, and this will make it possible to feed nuts of substantially small size automatically, thus resulting in saving of so much time and labor in the feeding process. The decrease of diameter will in turn make it possible to increase the length of spindle 6 that much without a fear of increasing its weight and of imparing its function, and this will make it possible to install the feeding unit sufficiently far from the electrodes B and C, thereby keeping the feeding unit away from the heat of electrodes; the unit can feed nuts to the positioning pin B1 correctly so long as the spindle 6 meets the pin B1 exactly, irrespective of the spindle length.

In addition, the feeding unit is quite simple in construction for instance as shown in FIG. 1, and this will save the manufacturing cost of same unit substantially. The simple construction will assure reliable operation without a fear of troubles.

The pneumatic cylinder 7 may be controlled either automatically with a given working cycle or by a foot pedal and other similar means with desired working cycles. It may be good to replace the pneumatic cylinder 7 with some other means which let the spindle 6 and sleeve 4 reciprocate similarly to the pneumatic cylinder 7.

The embodiment shown in FIG. 5 is constructed quite similarly to the embodiment shown in FIGS. 1 to 4, except that the former has a permanent magnet 10 in place of the latter's U-shape leaf spring 9 to hole a nut N in the shooting position just under the aperture 14 of block 1 when the sleeve 4 does not shoot the nut. Accordingly, the block 1, sleeve 4, spindle 6 and all other relevant parts are made of non-magnetic substances such as copper alloy in the embodiment shown in FIG. 5.

The embodiment shown in FIG. 5 is operated quite similarly to the embodiment shown in FIGS. 1 to 4, except that the sleeve 4 shoots a nut N through the outlet 13 of block 1 against the attraction of permanent magnet 10.

The embodiments shown in FIGS. 1 to 5 can be applied to feed washers automatically to a given processing position to be put on bolts which are brought to the same position one after another. More particularly, in this case, each bolt itself will perform the function of positioning pin B1 shown in FIG. 4. This application will also save much time and labor in comparison with conventional cases where washers are put on such bolts one after another by hand.

It will thus be seen that the feeding unit in accordance with the invention can feed nuts or washers automatically to a given processing position.

Since certain changes and modifications may be made in the invention, some of which have been herein suggested, it is intended that the foregoing shall be construed in a descriptive rather than in a limiting sense.

What I claim:

1. A feeding device of the kind to feed nuts or washers to a given processing position automatically, comprising a block, a nozzle uprightly mounted on said block in a fixed relation, a sleeve inserted in said nozzle in a slidable relation, a spindle inserted in said sleeve in a slidable relation, conduit means to supply nuts or washers continuously from outside to a shooting position just under said nozzle, driving means to have said spindle reciprocate in relation to said nozzle, spring means provided around said sleeve to hold said sleeve just above said shooting position normally, means provided on said sleeve to engage with said spindle to have said sleeve reciprocate together with said spindle, and means to keep a nut or washer in said shooting position, whereby nuts or washers are shot by said sleeve and guided along said spindle down to a given processing position one after another continuously as said spindle and said sleeve reciprocate in relation to said nozzle.

* * * * *